July 3, 1962 G. FERRI, JR 3,041,696
SNAP-ON HANGER CLOTHESPIN
Filed Dec. 5, 1958
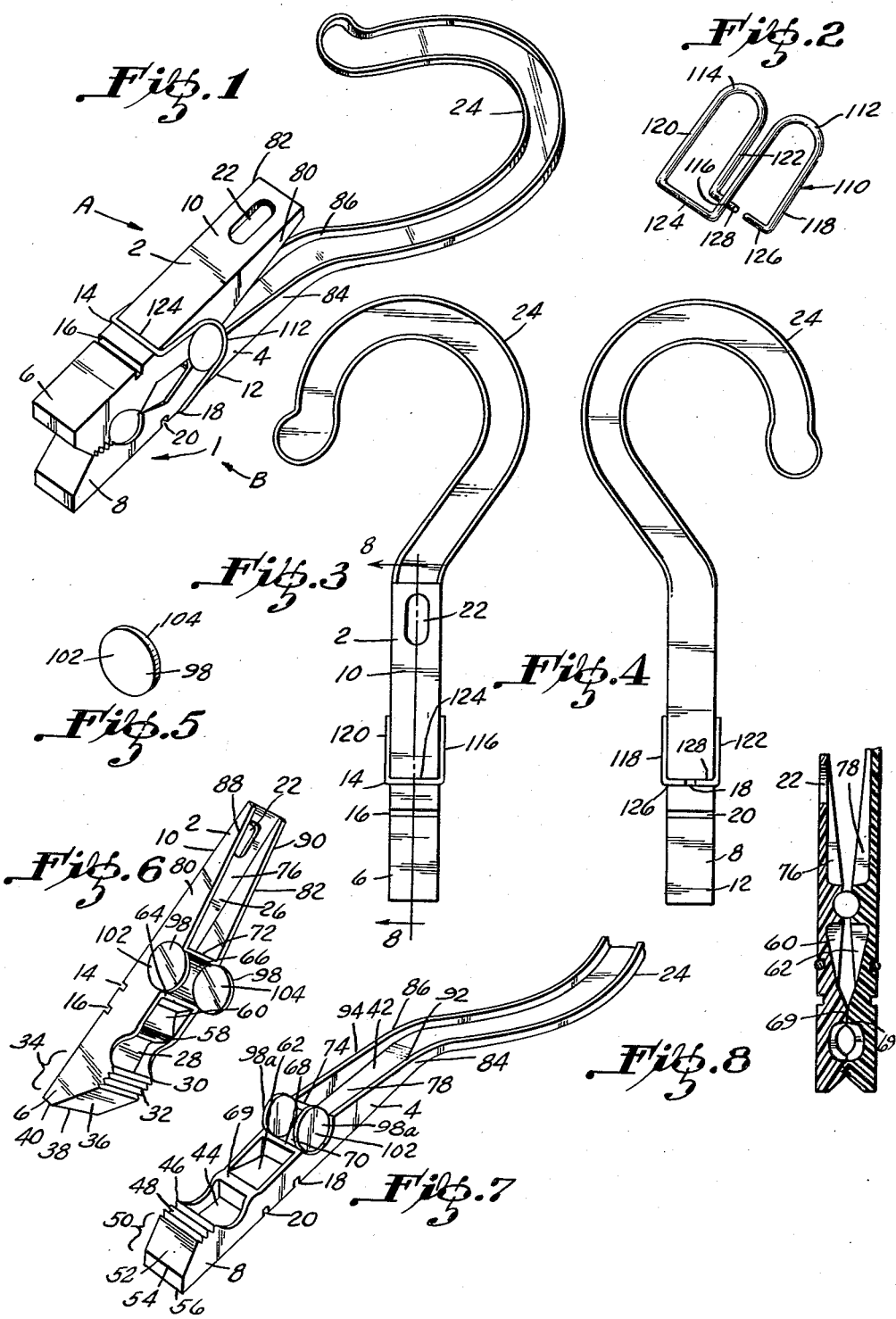

3,041,696
SNAP-ON HANGER CLOTHESPIN
Gustave Ferri, Jr., North Leominster, Mass., assignor to Foster Grant Co., Inc., Leominster, Mass., a corporation of Delaware
Filed Dec. 5, 1958, Ser. No. 778,436
1 Claim. (Cl. 24—137)

This invention relates to a snap-on hanger clothespin for suspending articles such as clothing from a support means.

Presently known clothespins are such as do not include, in combination, structural components, such as metallic spring members, which urge the jaws together and a pivotal mounting construction for holding the article gripping members, including the jaw members, against tilting and axial movement with respect to each other, without contacting the inner portions of said clothespin at any point thereof thereby preventing any contact between said metallic components and the article suspended and hold between the jaw members. The presently known clothespins are also such as do not include in said combination a spring means which is also simultaneously positively locked against any movement from its position with respect to the clothespin arm members including the jaw portions thereof.

The clothespin of this invention is a snap-on hanger clothespin and comprises a pair of spaced arms each having an outer face, an inner face, and spaced-apart substantially parallel faces, each of said arms having a gripping jaw portion at one end thereof, each of said gripping jaws being in opposing relationship, a hanger member extending from one arm at the other end thereof and an elongated slot extending through the other arm at the other end thereof, and means for pivotally mounting said arms with respect to each other and for holding said arms against relative tilting and relative axial movement, said means being between said arms. Also, each of said arms has in its outer face spaced apart transversely positioned grooves between said pivot mounting and holding means, one one hand, and said jaws, on the other hand, and also spring means in contact with only said outer arm faces and said side wall faces for urging said jaws together, this spring means being so constructed that it is positively locked against any movement out of its position with respect to said arms and that it has portions thereof positioned above the bottommost portion of said pivot mounting. The spring means further is so constructed that one portion thereof is positioned in one of the transversely positioned grooves in the outer face of one arm and another portion thereof is positioned in one of said transversely positioned grooves in the outer face of the other arm. The clothespin is so constructed that any possible contact of the article suspended and the spring means will always be prevented and, since the spring means comprises a formed metallic wire susceptible to corrosion, the article suspended will not be susceptible to being spotted by the corrosion products of said wire. The clothespin component elements, excluding said spring means, are preferably formed of a thermoplastic organic material such as nylon, polystyrene, a physical blend of polystyrene and natural or synthetic rubber, or a graft copolymer of styrene upon a synthetic or natural rubber and are preferably made by injection molding in accordance with any of the well known injection molding processes. The plastic is preferably transparent and may be opaque and/or colored.

More particularly with respect to the means for pivotally mounting said clothespin arms with respect to each other and for holding said arms against relative tilting and relative axial movement, one of said clothespin arms has in its inner face a horizontal groove of partial cylindrical or concave cross section and spaced-apart circular disc members fixedly positioned in said groove and spaced from the respective side walls of the arm in such a manner that a partial-cylindrical section of each of said discs extends from said groove. The other of said clothespin arms also has in its inner face a like horizontal groove of partial-cylindrical cross section opposite to the aforementioned horizontal groove. Fixedly positioned therein are likewise spaced-apart circular disc members in offset contacting relation at the side faces thereof to the other circular disc members at the respective side faces thereof in the other horizontal groove. The partial-cylindrical sections of the discs in one groove extend into the other groove in contact with the wall thereof and form a pivot mounting between said arms, and the arms are thereby also held against relative tilting and relative axial movement. The discs may be cemented into place by use of the well known adhesives for the plastic material used and are preferably of the same material as that of the arms.

Each of the gripping jaw portions of each arm also has, on its inner face, a notch, a bearing surface, and a tip portion, in that order, and the tip portion is downwardly inclined towards the outer face from the bearing portion towards the bottom of the jaw portion, and, also, each arm has, in its inner face, a recess positioned between the transverse partial-cylindrical groove and the aforementioned notch. The notch, the bearing surface, the inclined tip portion, and the recess in the inner face of one arm are opposite to the notch, the bearing surface, the inclined tip portion, and the recess in the inner face of the other arm, and tight gripping action of the jaws is caused.

The spring means is preferably formed of metallic wire and comprises a member which when in position contacts only the outer arm faces and side wall faces of the respective arms. The shaped spring means has two substantially arcuated portions substantially opposite and substantially parallel with and spaced from each other. Depending from each end of each arcuate portion is a downwardly extending leg portion, the leg portions depending from one arcuate portion being substantially opposite to and substantially parallel with and spaced from the respective leg portions depending from the other arcuate portion. Between one leg portion depending from one arcuate portion and the opposite leg portion depending from the other arcuate portion is a transverse portion connecting said leg portions. A transverse portion of the spring means extends from the other opposite leg portion depending from said one arcuate portion, and a transverse portion of the spring means extends from the other opposite leg portion depending from said other arcuate portion. The transverse portion between and connecting the aforesaid two leg portions is positioned and retained in one of said transverse, and preferably horizontal, grooves in the outer face of one of said arms, and the transverse portions extending from the other leg portions are positioned and retained in one of said transverse, and preferably horizontal, grooves in the outer face of the other of said arms. Each of the arcuate portions is positioned above the bottommost portion of, and preferably about, the pivot mounting at the respective side wall faces of the arms. Should it be desired to change the amount of force to be applied at the arm ends opposite to the gripping jaws for urging the said jaws apart to enable an article to be suspended to be positioned between said jaws, the respective transverse portions of the spring means are interchangeably positioned in the desired transverse, preferably horizontal, grooves in the respective outer faces of the arms. Thus, the spring means is so constructed that, when in position, it is positively locked against any movement out of its position with respect to the clothespin arms.

Preferably integral with and extending from the end of one arm is a curved hanger portion which preferably is on a plane parallel to the plane of the outer arm face. At the end portion opposite to the jaw portion of the other arm and extending through said arm is a slot, preferably elongated, which acts to position the finger of the individual to enable easy gripping to urge the jaws apart by pushing the end portions of the arm ends opposite to said jaws towards each other.

An object of this invention is to provide a snap-on hanger clothespin having arms which are held against relative tilting and relative axial movement with each other by its pivot mounting and which has, in combination with said pivot mounting and positioned above the bottommost portion of said pivot mounting, a spring means resisting but permitting spread of the clothespin jaw portions and being positively locked against any movement out of its position with respect to the clothespin arms, said spring means being so positioned with respect to the arms including the jaw portions thereof that there is not any possible contact between any portion of it and the article suspended between said jaw portions.

Another object of this invention is to provide a snap-on hanger clothespin which holds the suspended article away from the clothespin support means, thereby to prevent any contact between the article and the support means and which can be removed from the support means without releasing the article suspended therefrom.

Other objects and features will become readily apparent from the following detailed description which is illustrative of the preferred embodiment of my invention.

FIGURE 1 is a view in perspective of the snap-on hanger clothespin.

FIGURE 2 is a view in perspective of the spring means of the clothespin.

FIGURE 3 is a view in elevation of the clothespin in the direction of arrow A of FIGURE 1.

FIGURE 4 is a view in elevation of the clothespin in the direction of arrow B of FIGURE 1.

FIGURE 5 is a view in perspective of a circular disc used in forming the pivot mounting of the clothespin.

FIGURE 6 is a view in perspective of one arm of the clothespin of FIGURE 1.

FIGURE 7 is a view in perspective of the other arm of the clothespin of FIGURE 1.

FIGURE 8 is a sectional view taken on line 8—8 of FIGURE 3.

More specifically, the clothespin 1 comprises the arms 2 and 4 having the opposed gripping jaw portions 6 and 8 at the respective ends thereof. The arm 2 has the outer face 10, and the arm 4 has the outer face 12. Positioned in the outer face 10 are the spaced apart transverse, here shown as horizontal, grooves 14 and 16, and positioned in the outer face 12 are the spaced apart transverse, here shown as horizontal, grooves 18 and 20. Through the end portion of arm 2 is elongated slot 22, and shown integral with the end portion of arm 4 is the curved hook 24.

The gripping jaw portion 6 of clothespin arm 2 has in the inner arm face 26 the notch 28, the bearing surface 30 having grooves 32 therein, and tip portion 34 having inclined surface 36 terminating at edge 38 of bottom surface 40. The gripping jaw portion 8 of clothespin arm 4 has in its inner arm face 42 the notch 44, the bearing surface 46 having grooves 48 therein, and tip portion 50 having inclined surface 52 terminating at edge 54 of bottom surface 56. Also adjacent groove 28 on the inner face 26 is bearing surface 58, and adjacent groove 44 on the inner face 42 is the bearing surface 69. It is to be particularly noted that the edges 38 and 54 are smoothed or curved to prevent grabbing of the article held between said jaw portions.

Adjacent to bearing surface 58 is the recess 60 in the inner face 26 of arm 2, and adjacent to bearing surface 69 in the inner face of 42 of arm 4 is the recess 62 for enhancing the tightening action of said jaw portions.

Adjacent to the flat surface portion 64 of the inner face 26 is the partial-cylindrical groove 66, and adjacent to the flat surface portion 68 of the inner face 42 is the partial-cylindrical groove 70. Adjacent to partial cylindrical groove 66 is the flat surface 72 of the inner face 26, and adjacent to partial-cylindrical groove 70 is the flat surface 74 of the inner face 42. Adjacent to said flat surface 72 is the recess or pocket 76 in the inner face 26 of arm 2, and adjacent to said flat surface 74 is the recess or pocket 78 in the inner face 42 of arm 4.

Arm 2 has preferably parallel side faces 80 and 82, and arm 4 has preferably parallel side faces 84 and 86. Side walls 80 and 82 have inclined edge portions 88 and 90, respectively, and side walls 84 and 86 have inclined edge portions 92 and 94.

Two circular disc members or bosses 98, 98 are positioned in partial-cylindrical groove 66 in spaced apart relationship, as clearly shown in FIGURE 6, and cemented at the respective peripheral surface to the groove wall in such a manner that the outer flat surface 102 of one disc is coextensive with the side face 80 and the outer flat surface 102 of the other disc is coextensive with the side face 82. Two circular disc members or bosses 98a, 98a are likewise positioned in partial-cylindrical groove 70 in spaced apart relationship as clearly shown in FIGURE 7, and cemented at the respective peripheral surface to the groove wall in such a manner that outer flat surface 102 of one disc or boss is spaced from the side face 84 and the outer flat surface 102 of the other disc or boss is spaced from the side face 86. Thus, the inner face 104 of each of the discs or bosses 98, 98 in groove 66 will be in contact with the outer face 102 of each of the discs or bosses 98a, 98a in groove 70 thereby forming a pivot mounting between arms 2 and 4 which pivot mounting also holds the arm 2 and 4 against relative tilting and relative axial movement, as is clearly shown in the appended drawings.

The spring means 110 is preferably shaped from a spring steel wire and includes the arcuate portion 112 and the similarly shaped arcuate portion 114 preferably parallel at all points thereof to arcuate portions 112 and spaced therefrom. Depending from arcuate portion 112 is downwardly, slightly outwardly inclined leg portion 116 and downwardly, slightly outwardly inclined leg portion 118. Depending from arcuate portion 114 is downwardly, slightly outwardly inclined leg portion 120 and downwardly, slightly outwardly inclined leg portion 122, leg portion 120 being parallel to leg portion 116 and leg portion 122 being parallel to leg portion 118, as clearly shown in FIGURE 2. The transverse, preferably horizontal portion 124 connects leg portions 116 and 120 and is positioned and retained in horizontal groove 14. The transverse, preferably horizontal portion 126 extends from leg portion 118, and the transverse, preferably horizontal, portion 128 extends from leg portion 122. Said transverse portions 126 and 128 are positioned and retained in horizontal groove 18 and the leg portions 116, 118, 120 and 122 are in contacting relationship with the respective side wall faces, as clearly shown in the appended drawing while the arcuate portions are positioned about the aforesaid pivot mounting, as clearly shown in the appended drawing.

Having hereinabove described my invention, many alterations and changes may be made without departing from the spirit and scope of this invention which is set forth in the appended claim which are to be construed as broadly as possible in view of the prior art.

I claim:

A snap-on hanger clothespin comprising a pair of opposed arms, each of said arms having an outer face, an inner face and spaced-apart parallel side faces, each of said arms having a gripping jaw portion at the end thereof, the gripping jaw at the end of one arm being opposed to the gripping jaw at the end of the other arm, one of said arms having in its inner face a horizontal groove of substantially partial cylindrical cross section, spaced-apart circular disc members fixed in said groove and spaced from said respective side walls and having a partial-cylindrical section thereof extending from said groove, the other of said arms having in its inner face a horizontal groove of substantially partial-cylindrical cross section opposite to the horizontal groove in the inner face of said one of said arms, spaced-apart circular disc members fixed in said groove in offset contacting relation at a side face thereof to said circular disc members at a side face thereof in said horizontal groove in the inner face of said one of said arms and having a partial-cylindrical section thereof extending from said groove, said partial-cylindrical sections of said discs fixed in one groove extending into said other groove into contact with the wall thereof, thereby to form a pivot mounting between said arms, whereby said arms are held against relative tilting and relative axial movement, each of said gripping jaw portions having in its inner face a notch, a bearing surface, and a tip portion, in that order, said tip portion being inclined downwardly and towards the other face from said bearing portion towards the bottom of said jaw portion, each of said arms having a recess in its inner face beneath the horizontal groove and the notch, whereby there is caused a tight gripping action of the jaws, each of said arms having in its outer face spaced-apart horizontal grooves positioned between said pivot mounting and said notch, and spring means for urging said jaws together, said spring means being in contact only with the outer faces and with said side wall faces and being locked positively against any movement out of its position with respect to said arms, said spring means having portions thereof positioned above the bottommost portion of said pivot mounting, said spring means having a portion thereof positioned in one of said horizontal grooves in said outer face of one arm and another portion thereof positioned in one of said horizontal grooves in said outer face of the other arm, whereby any possible contact of the article to be held between said jaw portions and said spring means is prevented.

References Cited in the file of this patent

UNITED STATES PATENTS

| | | |
|---|---|---|
| D. 170,544 | Nalle | Oct. 6, 1953 |
| 57,977 | Sanborn | Sept. 11, 1866 |
| 175,478 | Marshall | Mar. 28, 1876 |
| 1,489,923 | Budd | Apr. 8, 1924 |
| 2,261,005 | Thompson et al. | Oct. 28, 1941 |
| 2,279,934 | Wisecup | Apr. 14, 1942 |
| 2,466,284 | Stinne | Apr. 5, 1949 |
| 2,506,783 | Fauteux | May 9, 1950 |
| 2,526,810 | Curtis | Oct. 24, 1950 |
| 2,590,881 | Morgan | Apr. 1, 1952 |

FOREIGN PATENTS

| | | |
|---|---|---|
| 909,046 | France | Nov. 19, 1945 |